(12) United States Patent
Yoshikawa et al.

(10) Patent No.: US 8,583,088 B2
(45) Date of Patent: Nov. 12, 2013

(54) ELECTRONIC APPARATUS

(75) Inventors: Shinya Yoshikawa, Iwaki (JP); Koichi Uno, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 9 days.

(21) Appl. No.: 13/281,056

(22) Filed: Oct. 25, 2011

(65) Prior Publication Data

US 2012/0157065 A1 Jun. 21, 2012

(30) Foreign Application Priority Data

Dec. 15, 2010 (JP) ................................. 2010-278892

(51) Int. Cl.
*H04M 3/42* (2006.01)

(52) U.S. Cl.
USPC .................. 455/414.2; 455/414.1; 455/456.5; 455/418; 455/419; 455/420

(58) Field of Classification Search
USPC ................. 455/414.2, 414.1, 456.5, 418–420
See application file for complete search history.

(56) References Cited

U.S. PATENT DOCUMENTS

| 2003/0156097 A1 | 8/2003 | Kakihara et al. |
| 2007/0109417 A1* | 5/2007 | Hyttfors et al. .......... 348/211.99 |
| 2010/0210253 A1 | 8/2010 | Brown |
| 2012/0001724 A1* | 1/2012 | Belimpasakis ................ 340/5.1 |
| 2012/0109451 A1* | 5/2012 | Tan .................................. 701/36 |

FOREIGN PATENT DOCUMENTS

| JP | 2003-095040 | 4/2003 |
| JP | 2003-244343 | 8/2003 |

* cited by examiner

*Primary Examiner* — Chuong A Ngo
(74) *Attorney, Agent, or Firm* — Brinks Gilson & Lione (57) ABSTRACT

An electronic apparatus is configured to display screen information supplied from a portable information terminal, and includes a connection unit configured to confirm if the portable information terminal is connected to the electronic apparatus. Also included is a notification unit configured to notify the portable information terminal of setting information concerning setting of the screen information supplied from the portable information terminal. A receiving unit is configured to receive the screen information that is set on the basis of the setting information from the portable information terminal, and a display unit is configured to display the screen information received by the receiving unit.

19 Claims, 6 Drawing Sheets

| BACKGROUND COLOR | CODE NUMBER |
|---|---|
| BACKGROUND COLOR 1 | 0001 |
| BACKGROUND COLOR 2 | 0010 |
| BACKGROUND COLOR 3 | 0011 |
| ⋮ | ⋮ |
| BACKGROUND COLOR n | 1111 |

UNITY IS ACHIEVED WITH BLUE

ELECTRONIC APPARATUS

PRIORITY CLAIM

This application claims the benefit of Japanese Patent Application No. 2010-278892, filed on Dec. 15, 2010, and which is incorporated by reference herein in its entirety.

BACKGROUND

1. Field of the Invention

The present invention relates to an electronic apparatus capable of remote control of a portable information terminal to which it is connected. In particular, the present invention relates to setting of screen information provided by a portable information terminal.

2. Description of the Related Art

Intelligent portable apparatuses typified by smartphones are increasingly used in recent years. When such a portable apparatus is installed in a vehicle, it is possible for a user to connect the portable apparatus to an in-vehicle electronic apparatus to use, for example, application software or media data of the portable apparatus in the in-vehicle electronic apparatus. For example, Japanese Unexamined Patent Application Publication No. 2003-244343 discloses a technology to display information displayed on the screen of a mobile phone on the large screen of an in-vehicle device. Japanese Unexamined Patent Application Publication No. 2003-95040 discloses an information display apparatus capable of easily varying the screen design of its display unit in accordance with a user's preference.

Connecting a mobile terminal, such as a smartphone, to an in-vehicle electronic apparatus and transferring screen information displayed in the mobile terminal to the in-vehicle electronic apparatus allows the in-vehicle electronic apparatus to display the screen of the mobile terminal or display two screens: the screen of the mobile terminal and a source screen (for example, on which a digital versatile disk (DVD) image or a terrestrial television program is displayed) of the in-vehicle electronic apparatus.

It is possible for the user to arbitrarily set the background colors, which are base colors of the displayed screens, in accordance with the user's preference in both of the in-vehicle electronic apparatus and the mobile terminal. The background color of the in-vehicle electronic apparatus may be different from that of the mobile terminal even if they are not set by the user. If two-screen display is adopted, that is, both of the screen of the in-vehicle electronic apparatus and the screen of the mobile terminal are displayed when the background color set in the in-vehicle electronic apparatus is different from the one set in the mobile terminal, it is not possible to achieve unity between the screen colors. For example, such a situation occurs in a case in which the background color of the screen of the in-vehicle electronic apparatus is blue and the background color of the screen information transferred from the mobile terminal is white. In addition, even when the two-screen display is not adopted, if the background color of the screen of the in-vehicle electronic apparatus is completely different from that of the screen of the mobile terminal upon switching of the screen of the in-vehicle electronic apparatus to that of the mobile terminal, it is likely to give a feeling of discomfort to the user.

Furthermore, switching between a daytime screen and a night screen, which are different in luminance, is normally performed in the in-vehicle electronic apparatus in conjunction with turning on or off of an illumination switch of the vehicle (switching between High and Low of a dimmer level). However, since the screen transferred from the mobile terminal is not switched, there is a problem in that the screen of the mobile terminal, particularly, which is transferred during night and is displayed in the in-vehicle electronic apparatus, is too bright.

SUMMARY

In order to resolve the above problems, it is an object to provide an electronic apparatus capable of achieving unity between screen information provided by a portable information terminal and screen information on the electronic apparatus.

It is another object to provide an electronic apparatus capable of varying the brightness of screen information provided by a portable information terminal.

According to an embodiment of the present invention, an electronic apparatus capable of displaying screen information supplied from a portable information terminal includes connection confirming means for confirming whether the portable information terminal is connected to the electronic apparatus; notifying means for notifying the portable information terminal of setting information concerning setting of the screen information supplied from the portable information terminal if the connection confirming means confirms that the portable information terminal is connected to the electronic apparatus; receiving means for receiving the screen information that is set on the basis of the setting information from the portable information terminal; and displaying means for displaying the screen information received by the receiving means.

The setting information is preferably set for a screen at the side of the electronic apparatus. The setting information preferably concerns a background color of the screen. The information concerning the background color is preferably selected from multiple background colors by a user. The setting information preferably concerns luminance of the screen. The setting information preferably concerns tone of the screen. It is preferred that the electronic apparatus further include detecting means for detecting vehicle information concerning an operation of a vehicle and that the notifying means notify the setting information having a luminance based on the vehicle information. It is preferred that the electronic apparatus further include detecting means for detecting vehicle information concerning an operation of a vehicle and that the notifying means notify the setting information having a tone based on the vehicle information. The detecting means preferably detects information about turning on or off of an illumination switch of the vehicle. The screen information supplied from the portable information terminal preferably concerns a road map screen for navigation. It is preferred that the displaying means include two screen display areas, and that the screen information about a medium of the electronic apparatus be displayed in one screen display area and the screen information supplied from the portable information terminal be displayed in the other screen display area.

According to another embodiment of the present invention, a media system includes an electronic apparatus; and a portable information terminal connectable to the electronic apparatus. The portable information terminal includes setting means for setting screen information on the basis of setting information notified from notifying means of the electronic apparatus; and transmitting means for transmitting the screen information set by the setting means to the electronic apparatus.

The setting means preferably sets a background color of the screen information on the basis of background color information notified from the notifying means. The setting means preferably changes the background color at the side of the portable information terminal when the background color at the side of the portable information terminal set for a screen of the portable information terminal is different from the background color notified from the notifying means. The setting means preferably sets a luminance of the screen information on the basis of information concerning the luminance of the screen notified from the notifying means. The setting means preferably sets a tone of the screen information on the basis of information concerning the tone of the screen notified from the notifying means.

According to another embodiment of the present invention, a display program is executed by an electronic apparatus capable of displaying screen information supplied from a portable information terminal. The display program includes the steps of confirming whether the portable information terminal is connected to the electronic apparatus; notifying the portable information terminal of setting information concerning setting of the screen information supplied from the portable information terminal if it is confirmed that the portable information terminal is connected to the electronic apparatus; receiving the screen information that is set on the basis of the setting information from the portable information terminal; and displaying the received screen information.

According to an embodiment of the present invention, since the setting information concerning the setting of the screen information supplied from the portable information terminal is notified to the portable information terminal, it is possible to achieve the unity between the screen information supplied from the portable information terminal and the screen information on the electronic apparatus. In addition, it is possible to match the brightness and/or the tone of the screen information supplied from the portable information terminal with the brightness and/or the tone in the electronic apparatus.

DETAILED DESCRIPTION

Embodiments of the present invention will herein be described in detail with reference to the attached drawings. A case in which an automobile is exemplified as a moving body and an electronic apparatus is mounted in the automobile is described here.

Figure 1:
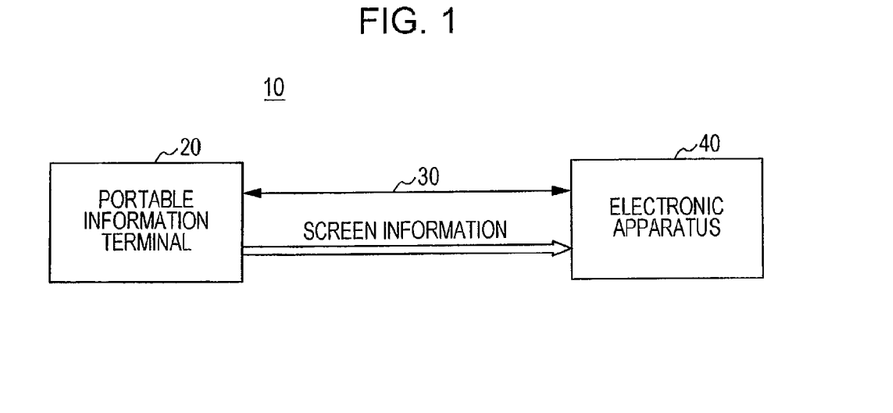
FIG. 1 is an example of a media system according to an embodiment of the present invention.

FIG. 1 illustrates an example of the configuration of a media system according to an embodiment of the present invention. Referring to FIG. 1, a media system 10 includes a portable information terminal (hereinafter shortly referred to as a portable terminal) 20 and an in-vehicle electronic apparatus (hereinafter shortly referred to as an electronic apparatus) 40 to which the portable terminal 20 is connected via connecting means 30. The electronic apparatus 40 is, for example, an information processing apparatus or a computer apparatus that performs a variety of information processing in response to a user's input. The function of the electronic apparatus 40 is not specifically restricted and the electronic apparatus 40 has, for example, a navigation function, an audio function, a video function, a television function, and/or a radio function. The portable terminal 20 is, for example, an information processing apparatus or a computer apparatus that performs a variety of information processing in response to a user's input. The function of the portable terminal 20 is not specifically restricted and the portable terminal 20 is, for example, a mobile phone, a smartphone, a portable audio playback apparatus, a portable video playback apparatus, or a portable information processing terminal. The connecting means 30 via which the portable terminal 20 is connected to the electronic apparatus 40 may be a wired cable or a wireless signal. For example, a universal serial bus (USB) cable, a wireless local area network (LAN), or Bluetooth may be used to connect the portable terminal 20 to the electronic apparatus 40.

Upon connection of the portable terminal 20 to the electronic apparatus 40 in the media system 10 of the present embodiment, the electronic apparatus 40 and the portable terminal 20 operate in a terminal mode. In the terminal mode, audio information, screen information, and operation information are transferred between the electronic apparatus 40 and the portable terminal 20 and the screen information displayed in the portable terminal 20 is displayed in the electronic apparatus 40. A user is capable of operating, for example, an icon on the screen displayed in the electronic apparatus 40 to perform remote control to an application of the portable terminal 20.

The screen information transferred from the portable terminal 20 to the electronic apparatus 40 and the operation information (for example, coordinate information on a touch panel or information input with keys) transmitted from the electronic apparatus 40 to the portable terminal 20 are subjected to communication control by using a Remote Frame Buffer (RFB) protocol. The audio information is subjected to the communication control by using Real-time Transport Protocol (RTP). According to the present embodiment, the electronic apparatus 40 and the portable terminal 20 are capable of operating in the terminal mode when the portable terminal 20 is connected to the electronic apparatus 40 via a USB cable or a wireless LAN (WLAN). It is assumed in the terminal mode that the Bluetooth is used. When the portable terminal 20 is connected to the electronic apparatus 40 via the Bluetooth, signals involved in the audio information is transmitted and received by using the Bluetooth.

Figure 2:
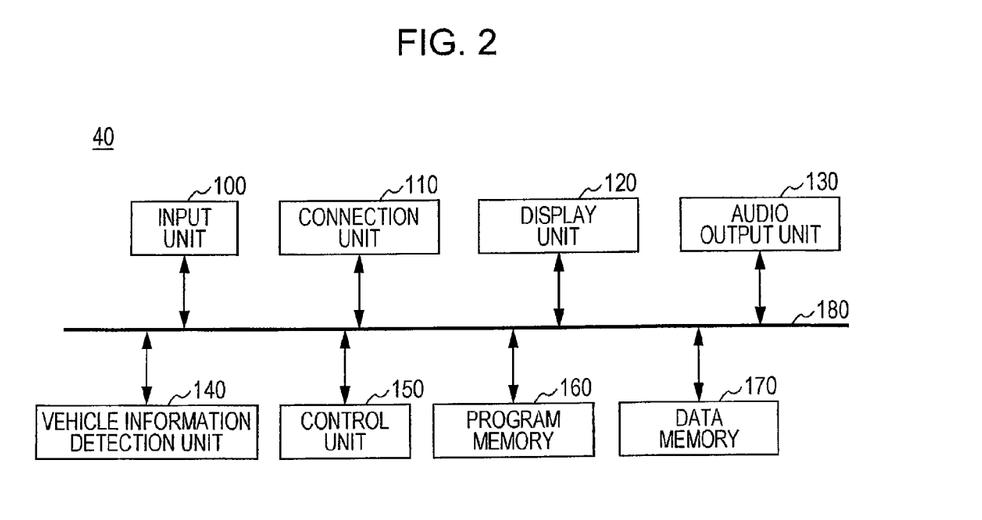
FIG. 2 is a block diagram of an in-vehicle electronic apparatus in FIG. 1.

FIG. 2 is a block diagram illustrating a typical configuration of the electronic apparatus 40. Referring to FIG. 2, the electronic apparatus 40 includes an input unit 100, a connection unit 110, a display unit 120, an audio output unit 130, a vehicle information detection unit 140, a control unit 150, a program memory 160, a data memory 170, and a bus 180. The input unit 100 receives an input from the user. The connection unit 110 establishes the connection with the portable terminal 20. The display unit 120 displays, for example, the screen information from the portable terminal 20 on the display of the electronic apparatus 40. The audio output unit 130 outputs an audio. The vehicle information detection unit 140 detects vehicle information. The program memory 160 stores programs for executing applications and so on. The data memory 170 stores music data, video data, map data, and so on and also stores background color information for setting the background color of the display unit 120 in a manner described below. The above components are connected to each other via the bus 180.

Preferably, the inputs into the input unit 100 include an input with the touch panel on the display, in addition to inputs with a remote controller and a cursor. The vehicle information detection unit 140 detects information concerning the turning on or off of the illumination switch or the setting of the dimmer level to High or Low and also detects Global Positioning System (GPS) positioning information, vehicle speed information, orientation information, etc. necessary for the navigation operation. The program memory 160 includes the programs for controlling the terminal mode executed when the portable terminal 20 is connected to the electronic apparatus 40, in addition to the programs for executing the navigation function, the audio function, the video function, and so on. In the terminal mode, the electronic apparatus 40 is capable of the remote control, such as activation of an application of the portable terminal 20 from the electronic apparatus 40, in conjunction with the portable terminal 20. The programs for controlling the terminal mode include a screen information display program for displaying the screen information supplied from the portable terminal 20 in the display unit 120.

Figure 3:
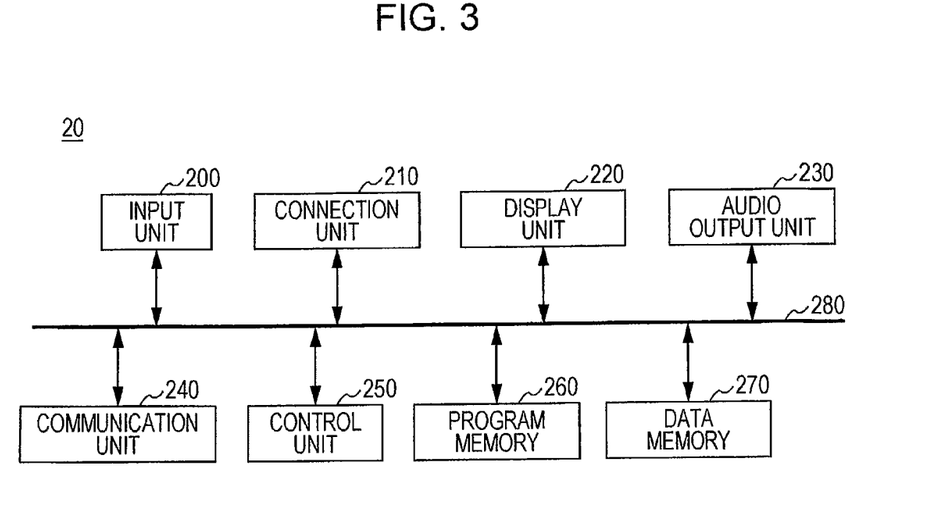
FIG. 3 is a block diagram of a portable information terminal in FIG. 1.

FIG. 3 is a block diagram illustrating a typical configuration of the portable terminal 20. Referring to FIG. 3, the portable terminal 20 includes an input unit 200, a connection unit 210, a display unit 220, an audio output unit 230, a communication unit 240, a control unit 250, a program memory 260, a data memory 270, and a bus 280. The input unit 200 receives an input from the user. The connection unit 210 establishes the connection with the electronic apparatus 40. The display unit 220 displays various images on the display of the portable terminal 20. The audio output unit 230 outputs an audio. The communication unit 240 performs data communication with an external server and is capable of making a call with a mobile phone. The program memory 260 stores programs, such as applications of the portable terminal 20. The data memory 270 stores music data, video data, map data, and so on. The above components are connected to each other via the bus 280.

Preferably, the program memory 260 includes the programs for controlling the terminal mode executed when the portable terminal 20 is connected to the electronic apparatus 40. In the terminal mode, the screen information displayed in the portable terminal 20 is transferred to the electronic apparatus 40 and the screen information is displayed in the display unit 120 in the electronic apparatus 40. The portable terminal 20 disables the input operation with the input unit 200 and activates an application subjected to the remote control in the terminal mode. In addition, the portable terminal 20 sets display conditions of the screen information to be transferred on the basis of setting information for the screen information from the electronic apparatus 40.

Figure 4:
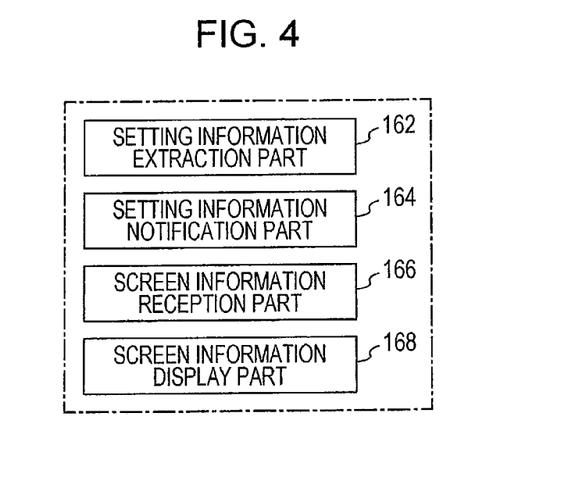
FIG. 4 is a functional block diagram of a screen information display program in the in-vehicle electronic apparatus.

FIG. 4 is a functional block diagram illustrating an example of the screen information display program stored in the program memory 160 in the electronic apparatus 40. The screen information display program controls display of the screen information transferred from the portable terminal 20 in the terminal mode. The screen information display program includes a setting information extraction part 162, a setting information notification part 164, a screen information reception part 166, and a screen information display part 168. The setting information extraction part 162 extracts the setting information on the screen displayed in the display unit 120 in the electronic apparatus 40. The setting information on the screen preferably indicates the background color of the screen when, for example, a menu screen or an application screen is displayed. Icons and key buttons are displayed on the background color on the menu screen, and information about the application is displayed on the background color on the application screen. The background color may be arbitrarily set by the user and the content of the setting is stored in the data memory 170.

The setting information notification part 164 notifies the portable terminal 20 of the setting information on the screen extracted by the setting information extraction part 162 in the terminal mode. This setting information is used to set the display conditions of the screen information in the portable terminal 20. The screen information reception part 166 receives the screen information transferred from the portable terminal 20 by using the RFB protocol in the terminal mode. The display conditions are set for this screen information on the basis of the setting information notified from the setting information notification part 164. The screen information display part 168 displays the screen information received in the terminal mode in the display unit 120.

Figure 5:
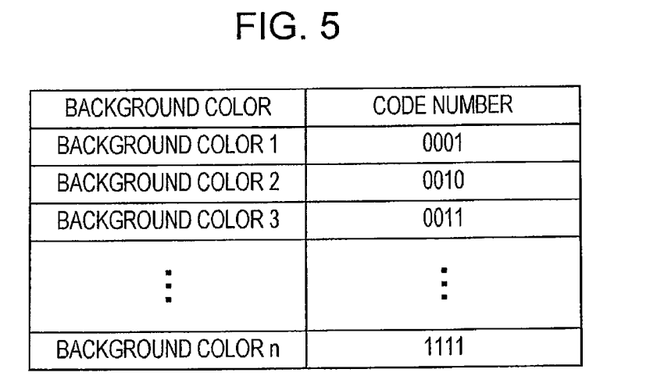
FIG. 5 is an example of a background color selection table used for selecting a background color on the displayed screen.

How to set the background color, which is a base color of the screen displayed in the display unit 120 in the electronic apparatus 40, will now be described. The background color is the color of the background on which, for example, icons, keys, and/or texts are displayed on the menu screen, the application screen, and so on. Preferably, a background color selection table illustrated in FIG. 5 is stored in the data memory 170. In the setting of the background color or the base color of the screen, the control unit 150 refers to the background color selection table to display background colors that can be selected in the display unit 120. The user selects a desired background color from the multiple background colors that are presented. The correspondence between multiple background colors (a background color 1, a background color 2, . . . , and a background color n) and the corresponding code information items is defined in the background color selection table. The code information corresponding to the background color selected by the user is stored in the data memory 170 as the setting information on the screen.

Preferably, the portable terminal 20 also includes a background color selection table in the data memory 270. In the setting of the background color or the base color of the screen of the display unit 220, the background color selection table is referred to, to store the code information corresponding to the background color that is selected in the data memory 270. A determination table that defines the correspondence between the code information defined in the background color selection table in the electronic apparatus 40 and the code information defined in the background color selection table in the portable terminal 20 is desirably provided in each of the electronic apparatus 40 and the portable terminal 20. The determination table can be referred to, to determine the background color set in the electronic apparatus 40 or the portable terminal 20.

Figure 6:
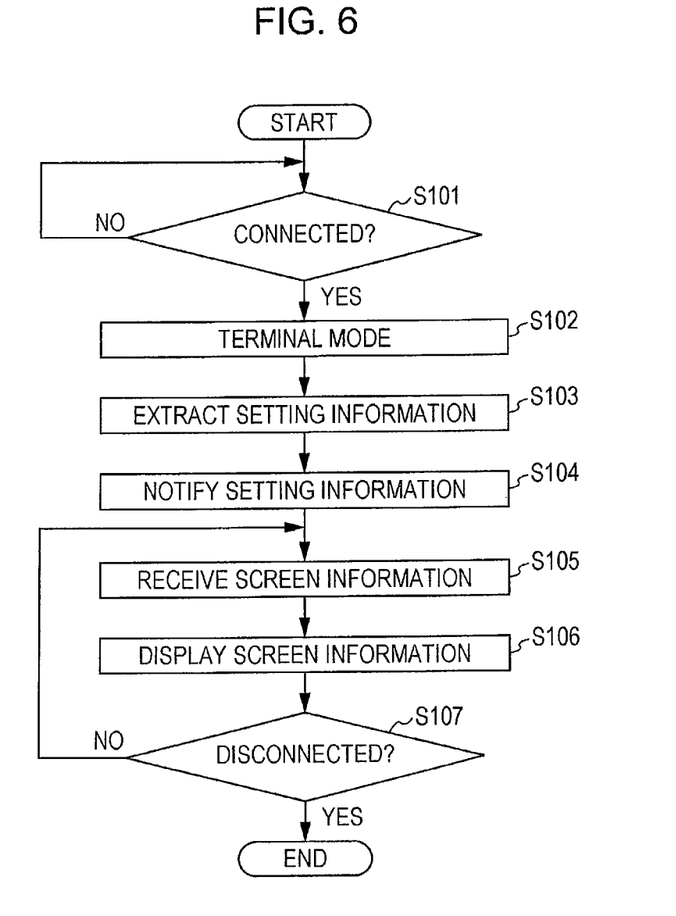
FIG. 6 is a flow chart illustrating an operation to display screen information according to a first embodiment.

A display operation according to a first embodiment of the present invention will now be described with reference to a flow chart in FIG. 6. Referring to FIG. 6, in Step S101, the electronic apparatus 40 confirms whether the portable terminal 20 is connected to the electronic apparatus 40 via the connection unit 110. The confirmation of the connection with the electronic apparatus 40 is also performed in the portable terminal 20. If the connection is confirmed in both of the electronic apparatus 40 and the portable terminal 20, in Step S102, the electronic apparatus 40 and the portable terminal 20 automatically enter the terminal mode. The shift to the terminal mode may be performed in response to a user's selection.

When the electronic apparatus 40 and the portable terminal 20 enters the terminal mode, in Step S103, the setting information extraction part 162 extracts the setting information on the screen in the display unit 120 in the electronic apparatus 40. The setting information on the screen is information about the background color or the base color. In Step S104, the setting information notification part 164 notifies the portable terminal 20 of the extracted setting information. The control unit 250 in the portable terminal 20 sets the background color in the screen information on the basis of the received setting information.

Figure 7:
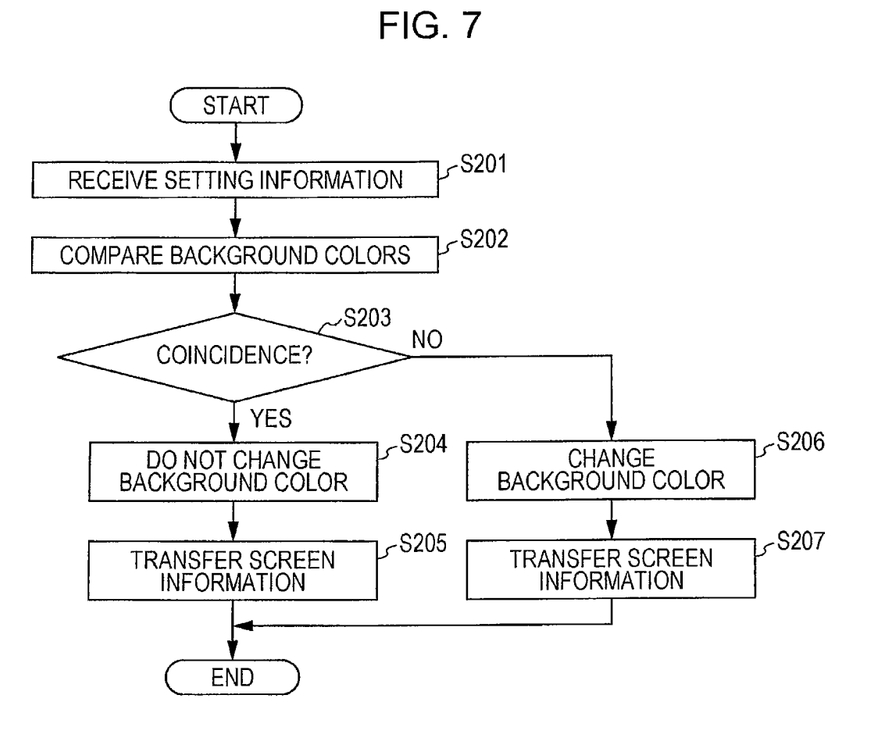
FIG. 7 is a flow chart illustrating an operation to set the screen information in a portable information terminal according to the first embodiment.

FIG. 7 is a flow chart illustrating an operation to set the background color in the portable terminal 20. Referring to FIG. 7, in Step S201, the control unit 250 in the portable terminal 20 receives the setting information. In Step S202, the control unit 250 compares the background color, which is the setting information on the screen of the display unit 220, with the background color, which is the setting information at the side of the electronic apparatus. In Step S203, the control unit 250 determines whether the background color on the screen of the display unit 220 coincides with the background color at the side of the electronic apparatus. For example, when the background color is set to blue in the electronic apparatus 40, the code information corresponding to blue is notified to the portable terminal 20 and the notified code information is compared with the code information corresponding to the background color set in the portable terminal 20. The coincidence of the code information is determined by using the determination table that is prepared in advance. If the background color on the screen of the display unit 220 coincides with the background color at the side of the electronic apparatus (YES in Step S203), in Step S204, the control unit 250 does not change the background color at the side of the portable terminal. In Step S205, the control unit 250 transfers the screen information displayed in the display unit 220 to the electronic apparatus 40 without change. If the background color on the screen of the display unit 220 does not coincide with the background color at the side of the electronic apparatus (NO in Step S203), in Step S206, the control unit 250 changes the background color on the screen of the display unit 220 to the background color coinciding with the background color at the side of the electronic apparatus. In Step S207, the control unit 250 transfers the screen information to the electronic apparatus 40.

The background colors that can be set in the portable terminal 20 may not necessarily coincide with the background colors that can be set in the electronic apparatus 40. In such a case, the control unit 250 selects a background color most similar to the background color set in the electronic apparatus 40 and transfers the screen information indicating the selected background color. Which background color is most similar to the background color set in the electronic apparatus 40 may be determined in advance. For example, multiple background colors having different similarity levels may be prepared for one background color and the background colors having higher similarity levels may be selected by priority.

Referring back to FIG. 6, in Step S105, the screen information reception part 166 receives the screen information indicating the adjusted background color from the portable terminal 20. In Step S106, the screen information display part 168 displays the received screen information in the display unit 120. In Step S107, the screen information display part 168 determines whether the connection with the portable terminal 20 via the connection unit 110 is disconnected. If the connection with the portable terminal 20 via the connection unit 110 is disconnected (YES in Step S107) or the terminal mode is terminated, the screen information display part 168 terminates the display of the screen information from the portable terminal 20 and switches to a source screen of a medium held by the electronic apparatus 40.

Figure 8:
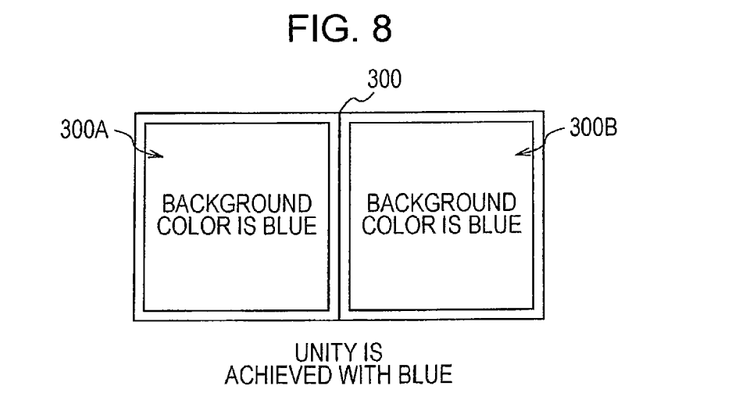
FIG. 8 is an example of a two-screen display in the first embodiment.

FIG. 8 illustrates an example of two-screen display in the display unit 120 in the electronic apparatus 40. When a user's instruction for the two-screen display is issued or in the shift to the terminal mode, the two-screen display can be automatically realized. The source screen of the medium of the electronic apparatus 40 is displayed on one sub-screen 300A on a display screen 300, and the screen information transferred from the portable terminal 20 is displayed on the other sub-screen 300B. For example, when the background color of the source screen 300A is blue, the sub-screen 300B on which the screen information transferred from the portable terminal 20 is displayed also has a background of blue and, thus, unity is achieved between the source screen 300A and the sub-screen 300B. Instead of the two-screen display, for example, also when the source screen of the electronic apparatus 40 is switched to the screen of the portable terminal 20 in the shift to the terminal mode, the user does not have a feeling of discomfort if the background color or the base color of the source screen of the electronic apparatus 40 is the same as that of the screen of the portable terminal 20.

For example, when the user selects a desired icon on the menu screen displayed in the display unit 120, the coordinate information about the selected icon is transmitted to the portable terminal 20. The portable terminal 20 activates an application on the basis of the received coordinate information. Upon activation of the application, the portable terminal 20 transfers the screen information that is the same as the one to be displayed in the display unit 120 to the electronic apparatus 40 and the transferred screen information is displayed in the display unit 120 in the electronic apparatus 40.

As described above, according to the present embodiment, the setting information on the screen set in the portable terminal 20 is changed on the basis of the setting information on the screen set in the electronic apparatus 40. Accordingly, it is possible to achieve the unity between the screen at the side of the electronic apparatus and the screen at the side of the portable terminal when the screen information transferred from the portable terminal 20 is displayed in the electronic apparatus 40. In addition, the display of the unified screens does not cause a feeling of discomfort to the user.

Note that the connection unit (110, 210), the setting unit (also referred to as the setting information extraction part), the receiving unit (also referred to as the receiving means or screen information reception part), the notification unit (also referred to as the setting information notification part), and the display control unit (also referred to as the control unit 150), are preferably hardware components, although such hardware components may in some embodiments perform additional functions or fewer functions than is described herein. Such hardware components may be shown as boxes in the corresponding block diagram figures.

Figure 9:
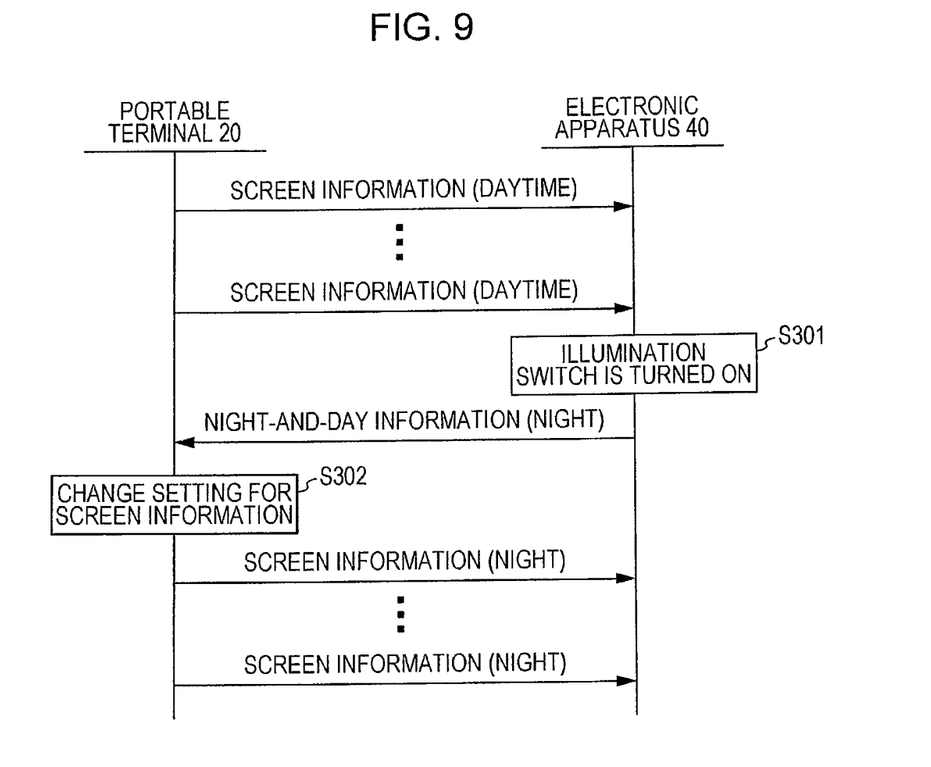
FIG. 9 illustrates a display operation according to a second embodiment.

A second embodiment of the present invention will now be described. FIG. 9 illustrates an operational flow of the second embodiment. The brightness and the tone of the screen displayed in daytime are varied from the brightness and the tone of the screen displayed in night in an in-vehicle electronic apparatus of the second embodiment. Day-and-night information for changing the brightness and the tone of the screen is used as the setting information in the second embodiment. It is assumed here that the portable terminal 20 and the electronic apparatus 40 each first display the screen in a day mode. The brightness is set to a relatively high value or the tone is turned up on the screen in the day mode.

The setting information extraction part 162 in the electronic apparatus 40 extracts the day-and-night information on the basis of the result of the detection in the vehicle information detection unit 140. Preferably, the day-and-night information indicates a night mode when the illumination switch of the vehicle is turned on (or the dimmer level is set to High) and indicates the day mode when the illumination switch thereof is turned off (or the dimmer level is set to Low). The setting information extraction part 162 extracts the result of determination of whether the day-and-night information indicates the day mode or the night mode, and the setting information notification part 164 notifies the portable terminal 20 of the day-and-night information as the setting information. The portable terminal 20 receives the day-and-night information indicating the day mode, determines whether the screen information of the portable terminal 20 indicates the day mode, and transfers the screen information to the electronic apparatus 40 if the screen is set in the day mode.

Referring to FIG. 9, upon turning on of the illumination switch of the vehicle in Step S301, the setting information extraction part 162 extracts the day-and-night information indicating the night mode and the setting information notification part 164 notifies the portable terminal 20 of the day-and-night information as the setting information. The control unit 250 in the portable terminal 20, which receives the setting information, determines whether the screen information indicates the night mode. If the screen information does not indicate the night mode, in Step S302, the control unit 250 changes the setting for the screen information to the night mode. The brightness is set to a low value or the tone is turned down on the screen in the night mode. Then, the screen information in the night mode is transferred to the electronic apparatus 40. The screen information in the night mode is displayed in the display unit 120 in the electronic apparatus 40 and, thus, a problem of the screen information that is too bright is resolved.

Similarly, upon turning off of the illumination switch, the setting information extraction part 162 extracts the day-and-night information indicating the day mode and the setting information notification part 164 notifies the portable terminal 20 of the day-and-night information as the setup information. The portable terminal 20 transfers the screen information set to the day mode to the electronic apparatus 40. The bright screen information in the day mode is displayed in the display unit 120 in the electronic apparatus 40 and, thus, a problem of the screen information that is too dark is resolved.

As described above, the portable terminal 20 changes the brightness of the screen information depending on whether the screen information is set to the day mode or the night mode. Specifically, the portable terminal 20 relatively turns down the brightness in the night mode and relatively turns up the brightness in the day mode. Instead of the change of the brightness, the tone of the screen may be made dark in the night mode and the tone of the screen may be made bright in the day mode. The degrees of the brightness and the tone are set in advance. Although the day-and-night information is set to the two stages: the day mode and the night mode by using the turning on-off of the illumination switch as a trigger in the above embodiment, three or more stages may be set. For example, reference to information about a clock mounted in the vehicle or time information may be made and a sunrise mode and/or a sunset mode may be provided between the day mode and the night mode.

Figure 10:
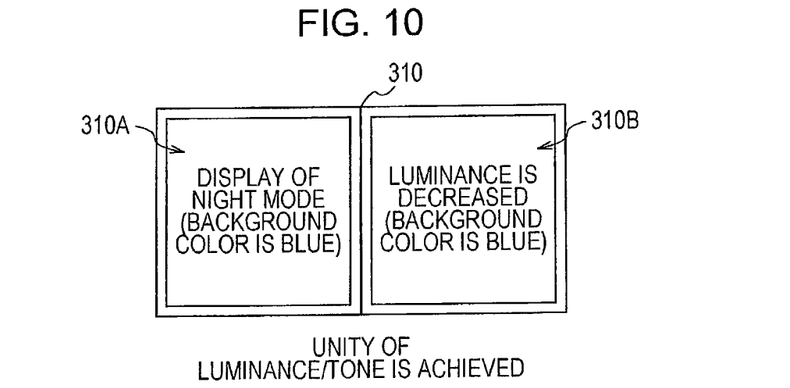
FIG. 10 is an example of two-screen display in the second embodiment.

FIG. 10 illustrates an example of two-screen display in the second embodiment. The source screen of the medium of the electronic apparatus 40 is displayed on one sub-screen 310A on a screen 310 of the display unit 120, and the screen information transferred from the portable terminal 20 is displayed on the other sub-screen 310B. When the illumination switch of the own vehicle is turned on, the source screen 310A is displayed dark in the tone of the night mode in conjunction with the turning on of the illumination switch. Since the sub-screen 310B on which the screen information transferred from the portable terminal 20 is displayed is also displayed in the tone of the night mode, it is possible to achieve the unity between the two sub-screens 310A and 310B. Instead of the two-screen display, also when the source screen is switched to the screen of the portable terminal, it is possible to display the screen in a similar brightness or tone.

In addition, in a combination of the first embodiment of the second embodiment, the background color of the sub-screen 310A is blue night color and the background color of the sub-screen 310B is blue having a reduced brightness. In this case, it is possible to achieve the unity of both the brightness and the tone of the screen.

A specific example of the second embodiment will now be described. It is assumed here that an application for the navigation function of the portable terminal 20 is subjected to the remote control by the electronic apparatus 40 in the terminal mode. The portable terminal 20 executes the navigation function and displays a screen of a road map around the position of the own vehicle in the display unit 220. Data about the road map screen may be held by the portable terminal 20 or may be received from an external server by communication. Information about the road map screen displayed on the portable terminal 20 is transferred to the electronic apparatus 40 by using the RFB protocol a few frames per second and the information about the road map screen is displayed in the display unit 120 in the electronic apparatus 40.

While the own vehicle is moving, the information about the road map screen transferred from the portable terminal 20 is displayed in the display unit 120. When the illumination switch of the vehicle is turned on by the user, the electronic apparatus 40 notifies the portable terminal 20 of the day-and-night information for changing the display conditions of the screen. The portable terminal 20 changes the information about the road map screen to the night mode on the basis of the day-and-night information and the information about the road map screen in the night mode is transferred to the electronic apparatus 40. The information about the road map screen in the night mode is displayed in the electronic apparatus 40 in the above manner.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An electronic apparatus configured to control a display screen of a portable information terminal, the electronic apparatus comprising:

a connection unit configured to confirm whether the portable information terminal is connected to the electronic apparatus;

a setting unit in the portable information terminal configured to obtain setting information corresponding to parameters of a display screen of the electronic apparatus, and configured to control parameters of the portable information terminal to be substantially the same as the parameters of the display screen of the electronic apparatus;

a receiving unit in the electronic apparatus configured to receive screen information from the portable information terminal;

a notification unit in the electronic apparatus configured to notify the portable information terminal of the setting information so as to control the display screen of the portable information terminal in accordance with the setting information of the display screen of the electronic apparatus; and a display control unit configured to control the display screen of the electronic apparatus.

2. The electronic apparatus according to claim 1,
wherein the setting information is set for a screen at a side portion of the electronic apparatus.

3. The electronic apparatus according to claim 2,
wherein the setting information includes a background color of the screen.

4. The electronic apparatus according to claim 3,
wherein the background color is selected by a user from a plurality of background colors.

5. The electronic apparatus according to claim 2,
wherein the setting information includes luminance of the screen.

6. The electronic apparatus according to claim 5, further comprising:
a detecting unit configured to detect vehicle information concerning an operation of a vehicle, and
wherein the notifying unit provides the setting information having a luminance based on the vehicle information.

7. The electronic apparatus according to claim 6,
wherein the detecting unit detects information about turning on or off of an illumination switch of the vehicle.

8. The electronic apparatus according to claim 7,
wherein the screen information supplied from the portable information terminal includes a road map screen for navigation.

9. The electronic apparatus according to claim 8,
wherein the display screen includes a first screen display area and a second screen display area, and
wherein the screen information about a medium of the electronic apparatus is displayed on the first screen display area, and the screen information supplied from the portable information terminal is displayed on the second screen display area.

10. The electronic apparatus according to claim 2,
wherein the setting information includes a tone of the screen.

11. The electronic apparatus according to claim 10, further comprising:
detecting unit configured to detect vehicle information concerning an operation of a vehicle,
wherein the notifying unit notifies the setting information having a tone based on the vehicle information.

12. The electronic apparatus according to claim 11,
wherein the detecting unit detects information about turning on or off of an illumination switch of the vehicle.

13. The electronic apparatus according to claim 12,
wherein the screen information supplied from the portable information terminal includes a road map screen for navigation.

14. The electronic apparatus according to claim 13,
wherein the display screen includes a first screen display area and a second screen display area, and
wherein the screen information about a medium of the electronic apparatus is displayed on the first screen display area and the screen information supplied from the portable information terminal is displayed on the second screen display area.

15. A media system comprising:
an electronic apparatus having a display screen;
a notification unit in the electronic apparatus configured to provide setting information to a portable information terminal so as to provide control parameters to the portable information terminal; and
the portable information terminal operatively coupled to the electronic apparatus,
wherein the portable information terminal includes:
a setting unit in the portable information terminal configured to set screen information based on the setting information provided by the notification unit so that a screen of the portable information terminal appears substantially similar to the display screen of the electronic apparatus; and
a transmitting unit configured to transmit the screen information set by the setting unit to the electronic apparatus.

16. The media system according to claim 15,
wherein the setting unit sets a background color of the screen information on the basis of background color information provided by the notification unit.

17. The media system according to claim 16,
wherein the setting unit changes the background color at the side of the portable information terminal when the background color of the portable information is different from the background color provided by the notification unit.

18. The media system according to claim 15,
wherein the setting unit sets a luminance of the screen information on the basis of luminance information provided by the notification unit.

19. The media system according to claim 15,
wherein the setting unit sets a tone of the screen information on the basis of tone information provided by the notification unit.

* * * * *